United States Patent
Lonsdale et al.

(10) Patent No.: US 7,034,661 B2
(45) Date of Patent: Apr. 25, 2006

(54) APPARATUS AND METHOD FOR INTERROGATION OF PASSIVE SENSORS

(75) Inventors: Anthony Lonsdale, Banbury (GB); Bryan Lonsdale, Banbury (GB)

(73) Assignee: Transense Technologies PLC, (GB)

( * ) Notice: Subject to any disclaimer, the term of this patent is extended or adjusted under 35 U.S.C. 154(b) by 293 days.

(21) Appl. No.: 10/177,322

(22) Filed: Jun. 20, 2002

(65) Prior Publication Data

US 2003/0234722 A1 Dec. 25, 2003

Related U.S. Application Data

(63) Continuation of application No. PCT/GB00/04910, filed on Dec. 20, 2000.

(30) Foreign Application Priority Data

| Dec. 20, 1999 | (GB) | ................................. | 9930033 |
| Oct. 5, 2000 | (GB) | ................................. | 0024416 |
| Nov. 14, 2000 | (GB) | ................................. | 0027765 |

(51) Int. Cl.
*H04Q 5/22* (2006.01)
*B60C 23/02* (2006.01)
*H04B 1/06* (2006.01)

(52) U.S. Cl. ............... 340/10.41; 340/442; 340/445; 340/449; 73/146.5; 455/232

(58) Field of Classification Search ............ 340/10.41, 340/10.441, 442, 443, 444, 445, 446, 447, 340/448, 449, 825.54; 73/146.5; 200/61.62; 455/232

See application file for complete search history.

(56) References Cited

U.S. PATENT DOCUMENTS

| 4,584,716 | A | * | 4/1986 | Drentea | ...................... 455/318 |
| 5,231,872 | A | * | 8/1993 | Bowler et al. | ............. 73/146.5 |
| 5,513,525 | A | * | 5/1996 | Schurmann | ................ 73/146.5 |
| 5,731,754 | A | | 3/1998 | Lee, Jr. et al. | |
| 5,749,984 | A | * | 5/1998 | Frey et al. | .................. 152/415 |
| 6,438,193 | B1 | * | 8/2002 | Ko et al. | .................... 377/24.1 |
| 6,591,671 | B1 | * | 7/2003 | Brown | ..................... 73/146.5 |
| 2002/0119759 | A1 | * | 8/2002 | Hahn | .......................... 455/77 |

OTHER PUBLICATIONS

PCT/GB00/04910 International Search Report.

* cited by examiner

*Primary Examiner*—Michael Horabik
*Assistant Examiner*—Scott Au
(74) *Attorney, Agent, or Firm*—Keusey, Tutunjian & Bitetto, P.C.

(57) ABSTRACT

A monitoring system, particularly suitable for monitoring conditions (e.g. pressure or temperature) of a vehicle tire comprises a passive sensor (102, 104), an antenna (106) associated with said passive sensor, and switching means (108) for controlling the connection between the passive sensor and the antenna such that, in a first state of said switching means, said antenna is prevented from transmitting a signal generated by the passive sensor, and, in a second state of said switching means, said antenna is permitted to transmit a signal generated by the passive sensor. The switching means is operated remotely by means of a control signal. The control signal may be derived from the sum or difference of RF signals ($F_1$ and $F_2$) applied to a filter (112) In alternative embodiments the control signal is the modulating frequency of an AM or FM modulated radio signal or a radio signal carrying a digital code.

11 Claims, 6 Drawing Sheets

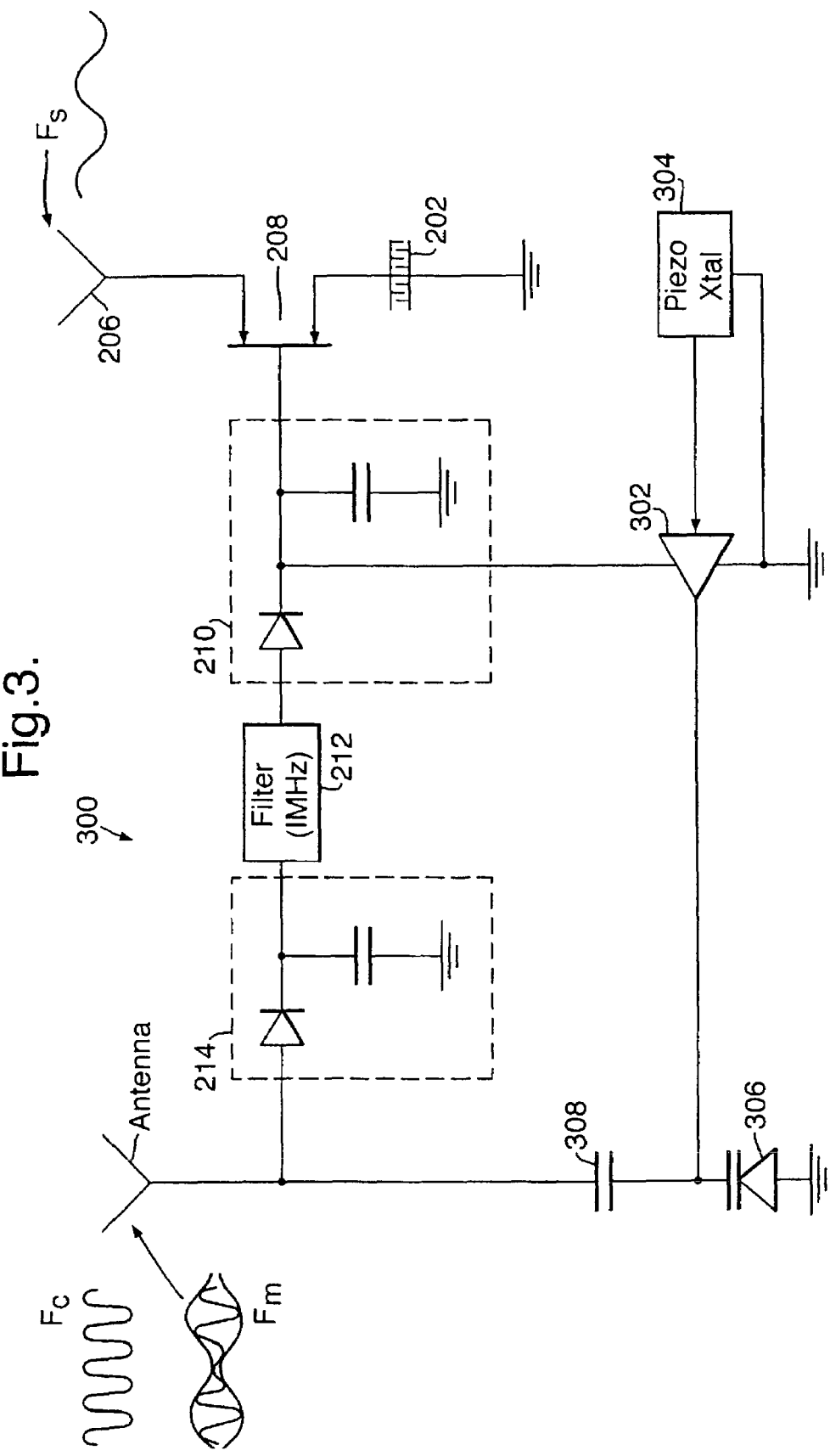

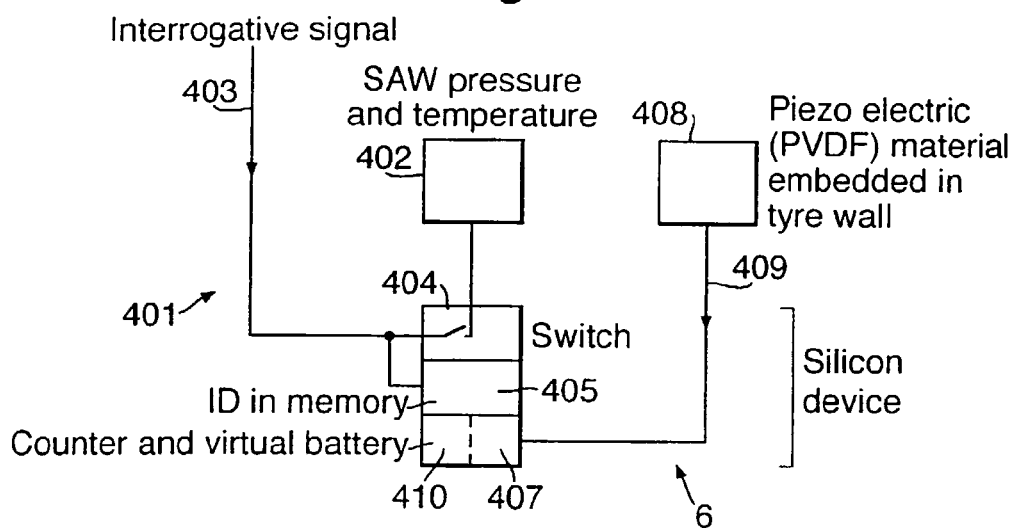
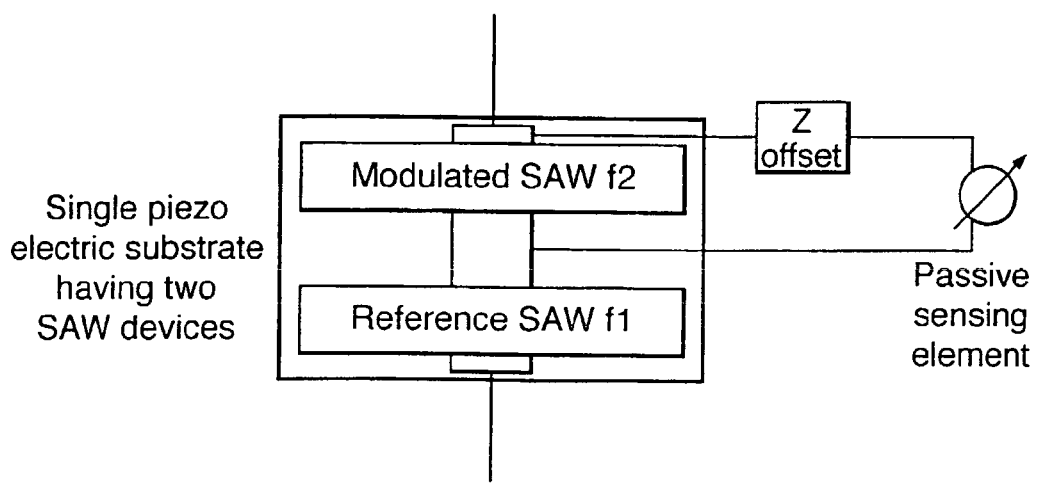

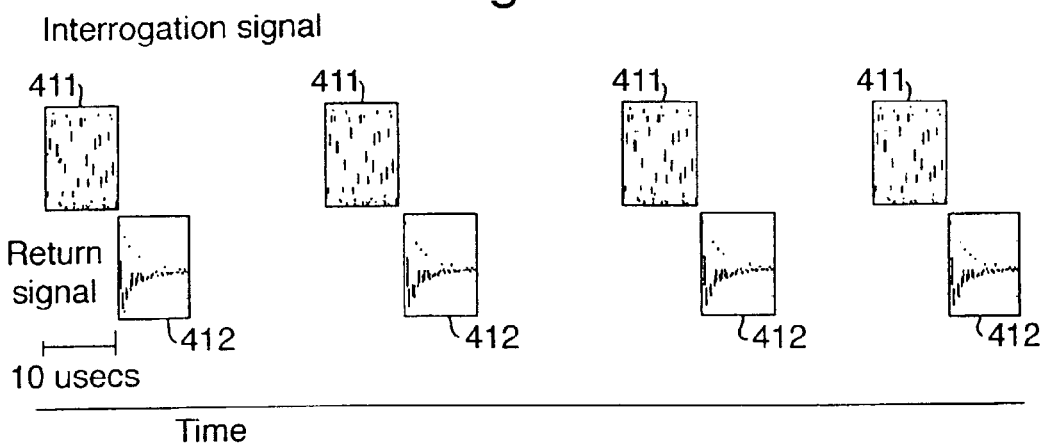
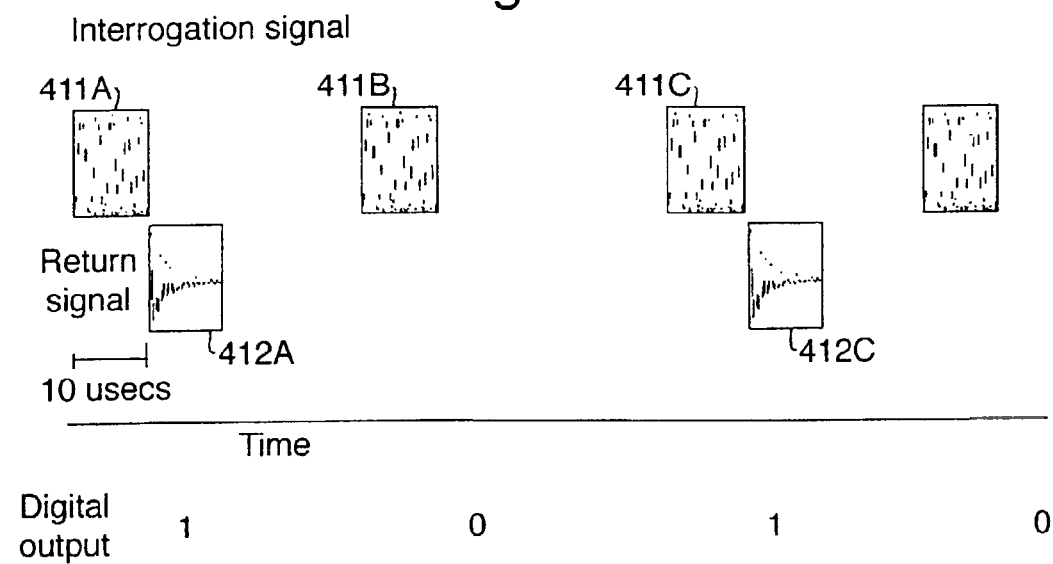

APPARATUS AND METHOD FOR INTERROGATION OF PASSIVE SENSORS

CROSS REFERENCE TO RELATED APPLICATIONS

This is a Continuation of International Application PCT/GB00/04910, with an International filing date of Dec. 20, 2000, that designates the United States and claims priority from GB application 9930033.7 filed Dec. 20, 1999, GB application 0024416.0 filed Oct. 5, 2000 and GB application 0027765.7 filed Nov. 14, 2000.

FIELD OF THE INVENTION

This invention relates to a tyre condition monitoring system in which the in-tyre components incorporate means controlling the transmission of tyre condition data. The tyre condition monitoring system of the present invention may include means for identifying the tyre to which the system is connected to a remote interrogation device.

It is now possible, by using radio communication techniques, to monitor characteristics of a tyre, for example temperature and pressure, whilst the tyre is in use.

DESCRIPTION OF RELATED ART

Typically, a sensor system may incorporate one or more Surface Acoustic Wave ('SAW') devices to act as data transmission devices. The SAW devices may be SAW resonators which provide an indication of tyre temperature and tyre pressure in response to interrogation of the SAW resonators by a remote device.

The use of SAW devices as the in-tyre elements of a radio communication system is particularly desirable since SAW devices do not require a dedicated power supply to act as a radio transceiver.

SUMMARY OF THE INVENTION

SAW devices are operated as radio transceivers by exciting the SAW device with a burst of radio frequency energy, and then listening to the radio frequency response transmitted by the SAW device in response to the excitation. SAW devices may accordingly be regarded as entirely "passive" in the sense that the output signal from them is produced in response to the input signal which they receive, without the need for any separate power supply. Accordingly, provided that the sensors used within the tyre to detect temperature, pressure, etc do not need power, a complete in-tyre monitor can be produced which does not require an in-tyre power supply. Such a monitor can be used indefinitely to monitor appropriate conditions of the tyres.

The particularly preferred embodiments of the invention make use SAW resonators as both condition sensors and as radio communication devices. Whilst this arrangement is particularly desirable, it is to be noted that the present invention is not limited to such arrangements but rather is applicable to all passive in-tyre condition monitoring systems.

Passive monitoring systems known heretofore based on SAW devices suffer from the disadvantage that they are only available with a limited number of mutually distinguishable characteristic identities. To an extent, SAW devices can be made with a characteristic frequencies range, and accordingly if, say, there are two tyres adjacent each other on a single axle it is possible to distinguish between the tyres by incorporating within one tyre a SAW device having one characteristic frequency range and incorporating within the other tyre a SAW device having a different characteristic frequency range. There are, however, significant practical limits to the number of different characteristic frequency ranges which can be used and accordingly the number of different tyres which can be positioned within range of the interrogation device without causing interference between the various results produced by interrogation.

The limited number of characteristic frequency ranges available is in part due to technical difficulties, and in part due to governmental restrictions on the rf frequencies which can be used without a license. For example, in many jurisdictions, the only radio frequencies which can be used freely without license are the so-called non-licensable Industrial Scientific Medical (ISM) frequencies of 868 MHz or 2.45 GHz. However, for manufacturing reasons, it is only practicable for frequencies in the 868 MHz band to be used. In this regard, it will be apparent to the skilled person that frequencies in the 2.45 GHz band are, at present, too high for use with SAW devices. This is because the electrode interdigital pitch associated with a SAW device for use in the 2.45 GHz band is too fine for production with current manufacturing techniques.

Although a SAW device may be satisfactorily interrogated through use of radio waves in the 868 MHz band, the bandwidth available is only approximately 2 MHz. With current manufacturing techniques, a SAW device can be provided with an exact frequency tolerance of ±0.1 MHz. However, in typical operating conditions, a SAW device will experience variations in its characteristic resonant frequency within a frequency band as broad as 0.5 MHz. Thus, although SAW devices having different characteristic resonant frequencies may be separately interrogated, the available 2 MHz non-licensable bandwidth is only sufficiently broad for the separate interrogation of two or three sensors. If more than three SAW devices are provided in a conventional sensor network within range of an interrogation device, then interrogation of at least one of said SAW devices will give rise to a response from two of said devices and the possibility of a consequential ambiguous measurement of the parameter being monitored.

It is the object of the present invention to assign each of a number of sensors a respective characteristic, other than inherent operating frequency, which enables the respective sensors to be distinguished from each other.

A first aspect of the present invention provides an apparatus comprising: a passive sensor; an antenna associated with said passive sensor; switching means for controlling the connection between the passive sensor and the antenna such that, in a first state of said switching means, said antenna is prevented from transmitting a signal generated by the passive sensor, and, in a second state of said switching means, said antenna is permitted to transmit a signal generated by the passive sensor; and remotely operable control means for controlling the state of the switching means.

Thus, in apparatus according to the present invention, operation of a passive sensor will only give rise to a receivable signal in the event that the switching means is in said second state. Accordingly, said passive sensor may be effectively switched "on" and "off" as desired by a user. In this way, signals received from passive sensors may be restricted to signals from those sensors to be interrogated at any one time. Erroneous measurements of parameters may be thereby avoided.

Preferably, the switching means is controlled by a coded radio frequency control signal. The control signal is coded such that only sensors having a corresponding code will be turned on by the coded signal.

In one range of embodiments of the invention the coding is provided by sending two rf signals to the sensor and applying the sum or difference of those signals to a filter having a characteristic pass frequency. If the sum (or difference as the case may be) of the two rf signals corresponds to the pass frequency of the filter a gate signal will be generated to change the switching means to the second state. The rf signals may be in the 2.45 GHz band. The pass filter may have a pass frequency of between 30 MHz and 100 MHz and a pass bandwidth of no more than 1 MHz In a second range of embodiments of the invention the coding is provided by amplitude modulation or frequency modulation of a control rf signal. In this case, the control rf signal is applied to a detector circuit the output of which is connected to a filter having a characteristic pass frequency. If the output of detector circuit corresponds to the pass frequency of the filter a gate signal will be generated to change the switching means to the second state. The filter may have a pass frequency of between 100 kHz and 10 MHz and a band width of 0.5 MHz.

In a third range of embodiments of the invention the coding is provided By a digitally coded rf signal which is applied to a digital filter. If the code carried by the rf signal corresponds to the code of the digital filter a gate signal will be generated to change the switching means to the second state.

It is preferable for said switching means to comprise means for generating a voltage in response to receiving a switching signal. The voltage generating means may be powered by said switching signal itself. The voltage generating means may be a virtual battery.

The switching means comprise a Field-Effect Transistor or an amplifier.

The passive sensor may comprise a SAW device and may comprise one or more acoustic sensors. When said passive sensor is an acoustic sensor, it is preferable for an amplifier to be provided for amplifying output from said sensor. Means are also preferably provided for affecting the efficiency of an antenna associated with said acoustic sensor. Said means for affecting antenna efficiency may comprise a variable capacitor.

A second aspect of the present invention provides a method of interrogating a passive sensor via an antenna associated with said passive sensor, the method comprising the steps of generating a predetermined switching signal; and applying said switching signal to switching means so as to control the connection between the passive sensor and the antenna.

In accordance with the third embodiments of the invention referred to above, a tyre condition monitoring device may comprise one or more sensors for sensing a condition of a tyre; storage means for storing an identification code associated with the sensor; receiving means for receiving a signal from a remote interrogating device, the signal including a portion indicative of an identification code; means of comparing the identification code received by the receiving means with the identification code stored in the storage means; a switch for connecting the sensor to the receiving means in response to an indication from the comparator that the identification code of the received signal corresponds to the identification code stored in the storage means; and a power supply for supplying electrical power to the device.

The power supply may include means for generating electrical energy within the tyre as the tyre is used and means for storing the electrical energy so generated. It may additionally or alternatively include means for capturing radio frequency (rf) energy received from the exterior of the tyre.

In one preferred embodiment of the invention the means for generating electrical energy generates a pre-determined number of pulses of electrical energy, for example one pulse of electrical energy, per revolution of the tyre. In this case, the device according to the present invention preferably also includes a counter, which stores a count of the number of the revolutions of the tyre. Preferably, the interrogating device is able to interrogate the stored count to determine the number of revolutions that the tyre has performed. This function is particularly desirable in large tyres such as those used on heavy civil engineering machinery. Such tyres are frequently leased and may be returned to the factory for re-capping on a number of occasions. It is particularly important that the re-capping process is commenced before the tyre has worn by too large an extent. By providing a remote indication of the total number of revolutions the tyre has completed, the revolution count may be used as a basis for deciding when the tyre should inspected and/or be withdrawn from service for recapping.

In one embodiment of the invention the device for producing a pulse of electrical energy is a piezo electric device, for example a PVDF device embedded within the structure of the tyre. With such a device, as the tyre is distorted when the portion of the tyre in which the device is embedded comes into contact with the ground, a pulse of electrical energy will be generated. The pulses serve to increment the counter and to charge an electrical storage device.

In another embodiment of the invention rf energy is captured to power the in-tyre components which require electrical power. The rf energy may conveniently be derived from the rf signals used to interrogate the tyre sensors. Part of this energy may be rectified to produce a DC current to power the in-tyre components. If desired an electrical storage device can be used to accumulate electrical energy derived from rf signals.

Preferably, the electrical storage device uses a capacitor as the means for storing the electrical energy. The power requirements of the system are very small, and by using a capacitor rather than a secondary electrical cell the system has a very long life expectancy and will not be adversely affected by the harsh environment in which the system has to operate.

Preferably, the sensors are SAW device based sensors. However, as noted above, the invention is not limited to systems using SAW devices but on the contrary cover all passive monitor systems. In particular the invention includes systems which make use of passive impedance to frequency conversion devices It will be appreciated that in order for the device to operate the received signal must incorporate an element corresponding to the identification code stored in the storage device. The interrogation device can, if desired, be pre-programmed with the identification code of all the tyres with which it is to operate (for example all four tyres of a four-wheeled face shovel). In the alternative, the interrogation device may in sequence issue interrogation signals corresponding to all possible ID codes for the type of tyre in question. For example, if an 8 bit binary identification code is used there will be 256 different possible codes which can be associated with individual tyres. The interrogation device may, in sequence issue all possible 256 identification codes and may, after the issue of each code, listen for a response. Responses will be received corresponding to four different individual identification codes (in the case of a four-wheeled vehicle). The interrogation device may then remember the interrogation codes associated with the four tyres and issue only those codes in future or may continue to issue all possible identification codes during future interrogation procedures.

If it is considered to be desirable to have a larger number of identification codes than can reasonably be sequenced by the interrogation device it will be necessary to provide means whereby the identification code of an individual tyre can be determined when the tyre is fitted to the vehicle so that the interrogation device may be programmed with this identification code. This could be done, for example, by establishing a coded signal which will cause any tyre to emit a signal indicating its identification code. With such an arrangement, it will be necessary to place the interrogation device and the tyre whose identification code is to be determined at a sufficient distance from any other tyres to prevent the interrogation signal from triggering more than one tyre to send its identification code. This is, however, entirely possible when the tyre is removed from a vehicle, or when there is only one tyre at each end of each axle of the vehicle. Under the latter circumstance an interrogation device associated with each tyre may have a range sufficiently short that it will not produce a response from any other tyre.

In accordance with a further aspect of the invention a tyre condition monitoring device comprises one or more sensors for sensing a condition of a tyre; storage means for storing an identification code associated with the sensor; receiving means for receiving a signal from a remote interrogating device, means for sending to the interrogation device signals indicative of the condition to which the sensor is sensitive, means for sending to the interrogation device signals indicative of the identification code, and a power supply for supplying electrical power to the device.

The power supply may include means for generating electrical energy within the tyre as the tyre is used. It may additionally or alternatively include means for capturing radio frequency (rf) energy received from the exterior of the tyre may include means for storing the electrical energy.

The first and second aspects of the invention may be combined with the result that each tyre will only provide an indication of the state sensed by the sensors in response to an interrogation signal corresponding to that tyre, but will also issue its own identification code as part of the interrogation sequence. Typically, the device will be activated by sending a signal including a portion corresponding to the identification code of the device. The device will then transmit the required signals indicative of the state being sensed, and will then transmit a signal indicative of the tyre identification code. The combination of only transmitting sensor information in response to a received signal including a portion corresponding to the stored identification code and transmitting the stored identification code at the end of the sensor information transmitting sequence gives a high degree of certainty to the interrogating device that the sensor information is associated with the correct identification code.

BRIEF DESCRIPTION OF THE DRAWINGS

The invention will be better understood from the following description of a preferred embodiment thereof, given by way of example only, reference being had to the accompanying drawings wherein:

FIG. 3 is a schematic circuit diagram of a third embodiment of the present invention.

FIG. 4 shows schematically a tyre condition monitoring device in accordance with an embodiment of the invention;

FIG. 5 shows a time sequence of interrogation signals and return signals from a SAW device sensor;

FIG. 6 illustrates how the return signals from the SAW device may be switched to provide digital encoding of a characteristic identification code.

FIG. 7 shows in schematic form a SAW based passive impedance to frequency converting device.

Figure 1:
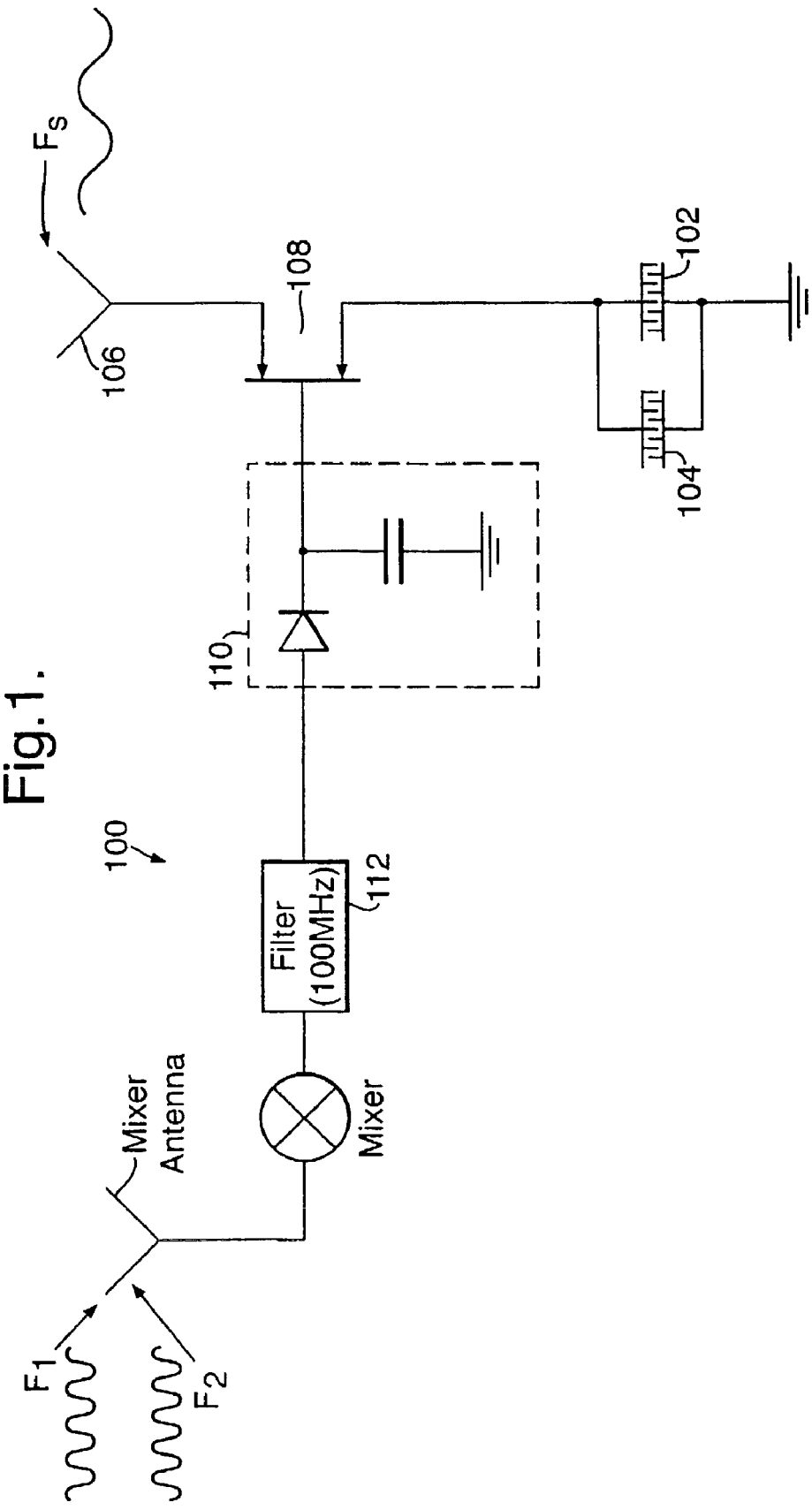
FIG. 1 is a schematic circuit diagram of a first embodiment of the present invention.

A first embodiment 100 of the present invention is shown in the schematic circuit diagram of FIG. 4. The first embodiment 100 incorporates two SAW devices 102,104 connected to one another in parallel. As will be understood by a reader skilled in the art, each SAW device 102,104 is provided with a pair of interleaved electrodes deposited on a piezoelectric substrate. One electrode of each SAW device 102,104 is connected to earth, whilst the remaining electrode of each device 102,104 is connected to a common antenna 106 via the channel of a Field-Effect Transistor (FET) 108. The arrangement is such that current flow between the SAW devices 102,104 and the antenna 106 is controlled at the channel of the FET 108 through the application of a voltage on the gate of the FET 108. Accordingly, the FET 108 may be referred to in general terms as a variable radio frequency coupling device. In an alternative embodiment (not shown) of a present invention, the variable radio frequency coupling device may be provided as a pin diode rather than a Field-Effective Transistor. Also, in an alternative embodiment, more or less than two SAW devices may be connected to a common antenna by means of a variable radio frequency coupling device.

The voltage on the gate of the FET 108 is supplied by a virtual battery 110 in response to a high frequency input signal. To the knowledge of the inventor, virtual batteries have not been previously used in connection with passive sensors, however their operation has been understood for many years and will be readily discernable by a person skilled in electrical engineering. The high frequency input signal to the virtual battery 110 is determined by a filter 112. In the first embodiment 100 shown in FIG. 4, the filter 112 is configured so as to allow passage of a signal having a frequency within a 1 MHz bandwidth centered on a frequency of 100 MHz. Thus, only those signals applied to the filter 112 having a frequency between 99.5 MHz and 100.5 MHz will be communicated to the virtual battery 110. In view of the signal frequencies applied to the filter 112, the filter 112 may be manufactured using a SAW device.

The arrangement described in relation to FIG. 4 is such that the SAW devices 102,104 can be effectively switched "on" and "off" as desired by a user. The provision of the FET 108 between the SAW devices 102,104 and the associated antenna 106 allows communication with the SAW devices 102,104 (via the antenna 106) to be restricted unless a signal having an appropriate frequency is applied to the filter 112. In the case of the first embodiment 100 of FIG. 1, communication with the SAW devices 102,104 via the associated antenna 106 may be made when a signal having a frequency of between 99.5 MHz and 100.5 MHz is applied to the filter 112. Such a signal passes through the filter 112 and is applied to the virtual battery 110 which, in turn, generates a voltage. The voltage from the virtual battery 110 is applied to the gate of the FET 108 so as to allow the required current flow between the SAW devices 102,104 and the antenna 106 for said communication with the SAW devices 102,104 to be made. The SAW devices 102,104 may then be regarded as being switched "on" and can be interrogated in a conventional manner. The SAW devices 102,104 may be configured to operate at a frequency $F_s$ in the 868 MHz band.

In circumstances where a large number of individual passive sensors or groups of passive sensors (e.g. SAW devices) are to be separately interrogated, the arrangement described hereinabove with reference to FIG. 1 may be adopted so as to provide means for separately switching said sensors or groups of sensors from an "off" condition to an "on" condition when said sensors or groups of sensors are to be interrogated. In a network of sensors arranged in accordance with the present invention, the filter associated with each individual sensor or each group of sensors is connected to a common signal mixer. The signal mixer is itself connected to an antenna for receiving electromagnetic radio waves in the 2.45 GHz band. Thus, a signal for application to a filter associated with a sensor or group of sensors may be generated by transmitting two signals of different frequencies in the 2.45 GHz band for reception by the mixer antenna.

For example, the group of SAW devices 102,104 shown in FIG. 1 may be switched from an "off" condition to an "on" condition by transmitting a first frequency $F_1$ of 2.5 GHz and a second frequency $F_2$ of 2.4 GHz to the mixer antenna. On reception by the mixer antenna, the two frequencies $F_1,F_2$ are mixed in the signal mixer. It is well known by those skilled in the art that the mixing of two frequencies generates sum ($F_1+F_2$) and difference ($F_1-F_2$) signals. Accordingly, signals having a frequency of 0.1 GHz (i.e. $F_1-F_2$) and 4.9 GHz (i.e. $F_1+F_2$) are generated by the mixer and applied to the filter 112 associated with the SAW devices 102,104. The filter 112 allows passage of the 0.1 GHz (i.e. 100 MHz) signal to the virtual battery 110, but blocks the 4.9 GHz signal. As previously described, on receiving a high frequency input signal, the virtual battery 110 applies a voltage to the gate of the FET 108 so as to permit signal transfer between the SAW devices 102,104 and the associated antenna 106 (and, therefore, so as to permit interrogation of the SAW devices 102,104). The SAW devices 102,104 are thereby effectively switched to an "on" condition and remain in said condition whilst the mixer antenna receives the two command signals $F_1,F_2$. The virtual battery generates voltage using the power of the input signal. Energy losses occur in the signal mixer and filter, however the 500 mW power level permitted in the 2.45 GHz band is sufficient for the virtual battery to operate satisfactorily.

Although, in a network of sensors, the mixer is connected to filters associated with individual sensors or groups of sensors other than those illustrated in FIG. 1, each filter is configured for a different frequency. As mentioned above, the filter frequencies may have a bandwidth of 1 MHz and be centered on frequencies in the range of 30 MHz to 100 MHz. Thus, by transmitting command signals having frequencies of 2.4 GHz and 2.5 GHz, the SAW devices 102,104 associated with the 100 MHz filter 112 are selectively switched to an "on" condition. The sum and difference signals of 0.1 GHz and 4.9 GHz respectively are blocked by the filters associated with other sensors within the sensor network. If a different sensor or group of sensors is to be interrogated, then different command signals $F_1,F_2$ are transmitted so as to generate an appropriate difference signal ($F_1-F_2$). For example, if sensors associated with a 50 MHz filter are to be interrogated, then the difference signal necessary to switch said sensors to an "on" condition may be generated by transmitting command signals having frequencies of 2.45 GHz and 2.50 GHz. Other sensors in the sensor network, including the SAW devices 102,104 associated with the 100 MHz filter 112, will remain in, or, switch to, an "off" condition. Erroneous measurements of parameters will be thereby avoided.

Sensors to be interrogated may be rapidly switched between "on" and "off" conditions (for example, at a frequency of 1 kHz) and the output signal generated by the sensor selectively processed through use of synchronous detection techniques.

Figure 2:
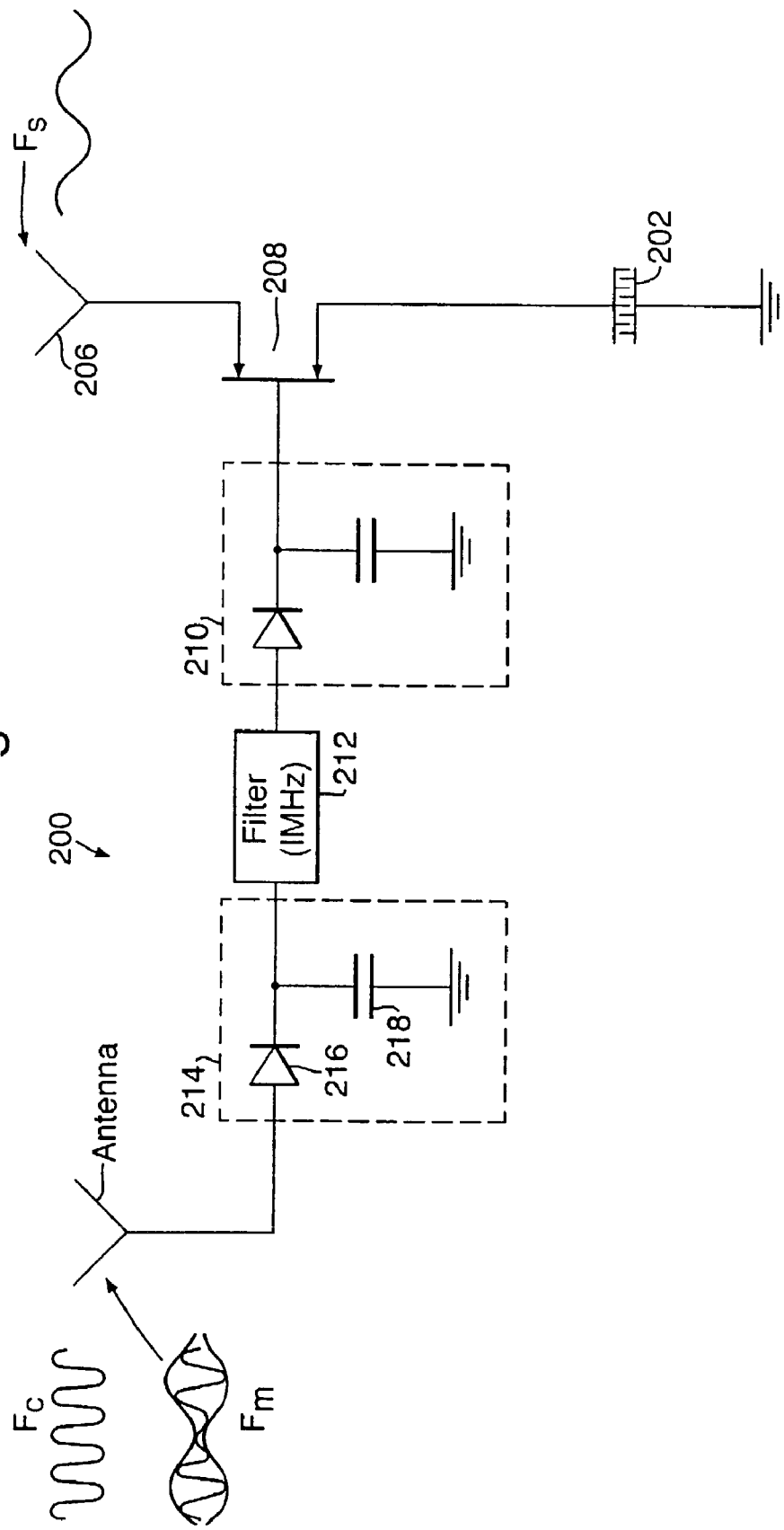
FIG. 2 is a schematic circuit diagram of a second embodiment of the present invention.

A second embodiment 200 of the present invention is shown in the schematic circuit diagram of FIG. 2. The second embodiment 200 incorporates a single SAW device 202 connected to an antenna 206 via the channel of a Field-Effect Transistor (FET) 208. A virtual battery 210 is connected to the gate of the FET 208 and a filter 212 is connected in series with the virtual battery 210. The arrangement of the aforementioned components of the second embodiment 200 is identical to that of the corresponding components of the first embodiment 100. However, the second embodiment 200 is a modification of the first embodiment 100 in that the switching signal to be applied to the virtual battery 210 via the filter 212 is generated by means of an amplitude modulated carrier command signal having a frequency $F_c$ in the 2.45 GHz band. The signal mixer of the first embodiment 100 is replaced in the second embodiment 200 by means 214 for generating a signal having a frequency based on the amplitude modulation frequency $F_m$ of the carrier signal. Said signal generating means 214 is shown schematically in FIG. 2 as incorporating a detector diode 216 and a capacitor 218. The form and operation of said signal generating means 214 will be readily apparent to a person skilled in electrical engineering. An antenna for receiving the command signal is connected to said signal generating means 214.

A sensor network may be arranged with a large number of individual passive sensors or groups of sensors connected to said signal generating means 214 via associated virtual batteries and filters. As discussed in relation to the first embodiment 100 of FIG. 1, each individual sensor or group of sensors may be separately interrogated provided each filter operates in respect of a different frequency. In the second embodiment 200 of FIG. 2, the filter 212 associated with the individual SAW device 202 operates in respect of signals having a frequency of 1 MHz. Thus, a command signal having a 1 MHz amplitude modulation would, when received by the antenna of said signal generating means 214, give rise to a 1 MHz signal being generated by said means 214 and the generation of a voltage by the virtual battery 210. As a result, the SAW device 202 is effectively switched to an "on" condition as previously discussed. The SAW device 202 may be then interrogated in a conventional manner. Other sensors in the sensor network will remain in, or, switch to, an "off" condition. Erroneous measurements of parameters will be thereby avoided.

The filter frequencies may have a bandwidth of 0.5 MHz and be centered on frequencies in the range of 100 kHz to 10 MHz. A sensor or group of sensors may be switched to an "on" condition (so as to permit their interrogation) by transmitting a command signal appropriately modulated in view of the operating frequency of the relevant filter. Having regard to the aforementioned filter frequencies, the filters used in connection with the second embodiment preferably incorporates discrete inductor and capacitor components rather than SAW devices (which would be undesirably large at the low frequencies involved).

In addition to a conventional modulation of a carrier signal, modulation may be effectively achieved through repeatedly turning the carrier signal on and off.

The first and second embodiments 100,200 described hereinabove incorporate either an individual SAW device 202 or a group of SAW devices 102,104. However, passive sensors other than SAW devices may be used in connection with the present invention. For example, an acoustic sensor or group of acoustic sensors may be selectively interrogated by means of the present invention. A piezo acoustic sensor (i.e. a microphone) may, for example, be mounted on a surface and used to monitor propagation of cracks in said surface. An embodiment of the present invention incorporating a piezo acoustic sensor may be similar to those previously described. However, the voltage generated by the virtual battery associated with the acoustic sensor may be applied to an amplifier for amplifying output from said acoustic sensor. Output from the amplifier is preferably both earthed via a variable capacitor (i.e. a VARICAP) and directed to an antenna via a capacitor. The antenna associated with the amplifier may be the antenna used for receiving the command signals. The arrangement may be such that, on application of a voltage from the virtual battery to the amplifier, the piezo acoustic sensor is effectively switched to an "on" condition. If the acoustic sensor detects a noise, then output from said sensor is amplified by said amplifier. Accordingly, the voltage at the VARICAP increases. Characteristically, the capacitance of the VARICAP decreases with the aforementioned voltage increase. This in turn decreases the efficiency of the antenna associated with the acoustic sensor. Thus, when noise is detected by the acoustic sensor, a proportion of a signal transmitted for reception by the sensor antenna is reflected. The degree of reflection is dependent upon on the degree of noise detected. Accordingly, the reflected signal may be itself detected so as to provide a determination of the noise at the acoustic sensor. In this way, the propagation of a crack, for example, may be monitored.

A third embodiment 300 of the present invention is shown in the schematic circuit diagram of FIG. 3. The third embodiment 300 is a modification of the second embodiment 200 wherein the virtual battery 210 generates a voltage for application to an amplifier 302 of a piezo acoustic sensor 304 as well as a voltage for application to the FET 208 of SAW device 202. As previously described, the output of the amplifier 302 is directed to earth via a VARICAP 306 and to an antenna via a capacitor 308. In the third embodiment 300, the antenna associated with the piezo acoustic sensor is also the antenna used for receiving command signals. In use of the third embodiment 300, reception of a command signal having a 1 MHz amplitude modulation results in both the SAW device 202 and the piezo acoustic sensor 304 being switched to an "on" condition. Accordingly, the arrangement is such that crack propagation can be monitored simultaneously with strain measurement. In the event that the acoustic sensor detects noise, the efficiency of the antenna receiving the modulated command signal is adversely affected and a proportion of said command signal is reflected. The received command signal is nevertheless sufficiently powerful for the virtual battery 210 to generate adequate voltage for application to the amplifier 302 and FET 208. The reflected signal allows monitoring of the crack propagation. Meanwhile, a measurement of strain may be obtained through interrogation of the SAW device 202 using the 868 MHz band in a conventional manner.

Referring now to FIG. 4 there is shown schematically a tyre condition monitoring device 401. In use, the device will be mounted on or embedded in a tyre. Whilst the invention is applicable to a wide range of tyres it has particular utility in the case of large tyres of the type used on civil engineering machinery and large road going vehicles.

The device includes one or more sensors 402. The sensors are preferably SAW device based but may be of any other passive type, for example nanophase wire or strip or other passive impedance to frequency converting devices and may provide indications of tyre pressure and tyre temperature and strain (for example multi axis strain) in the tyre. It is to be understood, however, that the invention is not limited to such sensors and could be operated with sensors capable of producing signals other than temperature, pressure or strain.

As will be appreciated by those skilled in the art, SAW device sensors are capable of providing an indication of a characteristic feature of the sensor in response to an interrogation signal sent from a remote RF source. The interrogation signal is received by an antenna 403 which forms part of the device of FIG. 4 and, when the switch 404 is closed, the antenna 403 and sensor 402 operate in a conventional manner to provide a remote indication of the conditions to which the sensor is sensitive.

The device of the present invention incorporates a storage and comparator device 405 which is capable of storing an identification code which identifies the particular device in question and, by extension, the tyre to which the device is secured. The identification code may be of any conventional form and may, for example, be in the form of an 408 bit digital code providing a total of 256 different code combinations.

The comparator/storage device 405 is powered from a power source 406 which includes an electrical energy storage device 407 and an electrical energy source 408. In the illustrated embodiment of the invention the electrical energy source 408 is a piezo electric device of PVDF material embedded in the wall of the tyre. Such a device generates an electrical pulse in response to distortion of the tyre wall and accordingly as the tyre rotates one pulse of electrical energy is generated per revolution of the tyre. The pulses of electrical energy are transmitted via a connection 409 to the electrical energy storage device 407. The electrical energy storage device 407 may be of any suitable type, and in the preferred embodiment comprises a capacitor. Energy for the storage device may additionally or alternatively be powered by remotely transmitted RF energy Preferably, the device of the present invention also includes a counter 410 which is incremented or decremented by one count in response to each pulse of electrical energy produced by the piezo electric device 408. Accordingly, the count held by the counter 410 provides an indication of the total number of revolutions the tyre has undertaken since the count was reset.

In use, a remote interrogation device sends an interrogation signal to the monitoring device 401. The interrogation signal is received by the antenna 402. The interrogation signal includes a portion which carries an identification code. For example, the interrogation signal may be a modulated RF signal having a portion carrying the identification code. The identification code carried by the modulated signal can be established by means of a suitable demodulator device. The switch 104 has a normally open state and in the event that the identification code portion of the interrogation signal does not correspond to the identification code stored in the storage device 405, and the switch 404 will remain open and the sensor will not be interrogated. Power for the demodulator and comparator is derived from the energy storage device 407.

In the event that the identification code portion of the interrogation signal corresponds to the interrogation code stored in the storage device 405, the switch 404 is closed and thereafter the antenna 403 is connected to the sensor 402 to function in conventional manner. As illustrated in FIG. 2, bursts of interrogation signal 411 of, for example 10 microseconds duration will produce a characteristic return signal 412. Successive interrogation signals 411 are spaced apart to provide the required duty cycle. Preferably, after a predetermined number of interrogation signal/return signal cycles the switch 404 is operated to interrupt the flow of return signals to provide a digital signal corresponding to the identification code stored in the storage device 405. A schematic portion of such an arrangement is shown in FIG. 6. The first interrogation signal 411A produces a characteristic return signal 412A, thereby signifying a digital output "1". The switch 404 is then opened and accordingly the next interrogation signal 311B does not produce a characteristic return signal. This provides a digital "0" response. The switch 104 is then re-closed and the next interrogation signal 411C produces a characteristic response 412C, again representing a digital "1".

Preferably, the digital signal transmitting arrangement repeats the identification code several times to remove possible errors.

A signal indicative of the count held by the counter 410 may be transmitted as part of each interrogation sequence or may only be transmitted in response to a specific request identified by a specific digital coding in the interrogation signal. Again, appropriate operation of the switch 404 in combination with bursts of interrogation signal may be used to digitally encode the count held by the counter 410.

The switch 404, storage and comparator device 405, counter 410, and associated control circuitry may conveniently be formed as a single silicon device. The electrical storage device 407 may be constituted by a virtual battery which is part of the silicon device.

Similarly for the multi axis strain sensor the silicon can have a pre-programmed number corresponding to an acceptable level of strain in each axis and the raw data from the sensor compared with this stored number to produce a single output that may more readily be transmitted using the arrangement of this invention. This puts the processing in the tyre not the vehicle.

The remote interrogation device may issue a succession of interrogation signals each of which carries a different identification code portion, so that the entire range of possible identification codes are issued in sequence. With such an arrangement the interrogation device will only receive responses when the interrogation signal it issues corresponds to the identification code carried by one of the devices within range of the interrogation system. Alternatively, the interrogation system may be pre-programmed with the identification codes of the devices within range and may only issue interrogation signals corresponding to those particular devices.

If desired, the device may be responsive to a master code as well as its own unique identification code. With such an arrangement, by moving a particular tyre and interrogation device out of radio range of other tyres, the master code may be transmitted and may then induce the sending of the identification code associated with a particular tyre. By this means, tyres stored in workshops may have the identification code ascertained immediately prior to fitting of the tyre to a vehicle, and this identification code may then be programmed into the vehicle interrogation device to enable that particular tyre to be interrogated whilst it remains on the vehicle.

Figure 8:
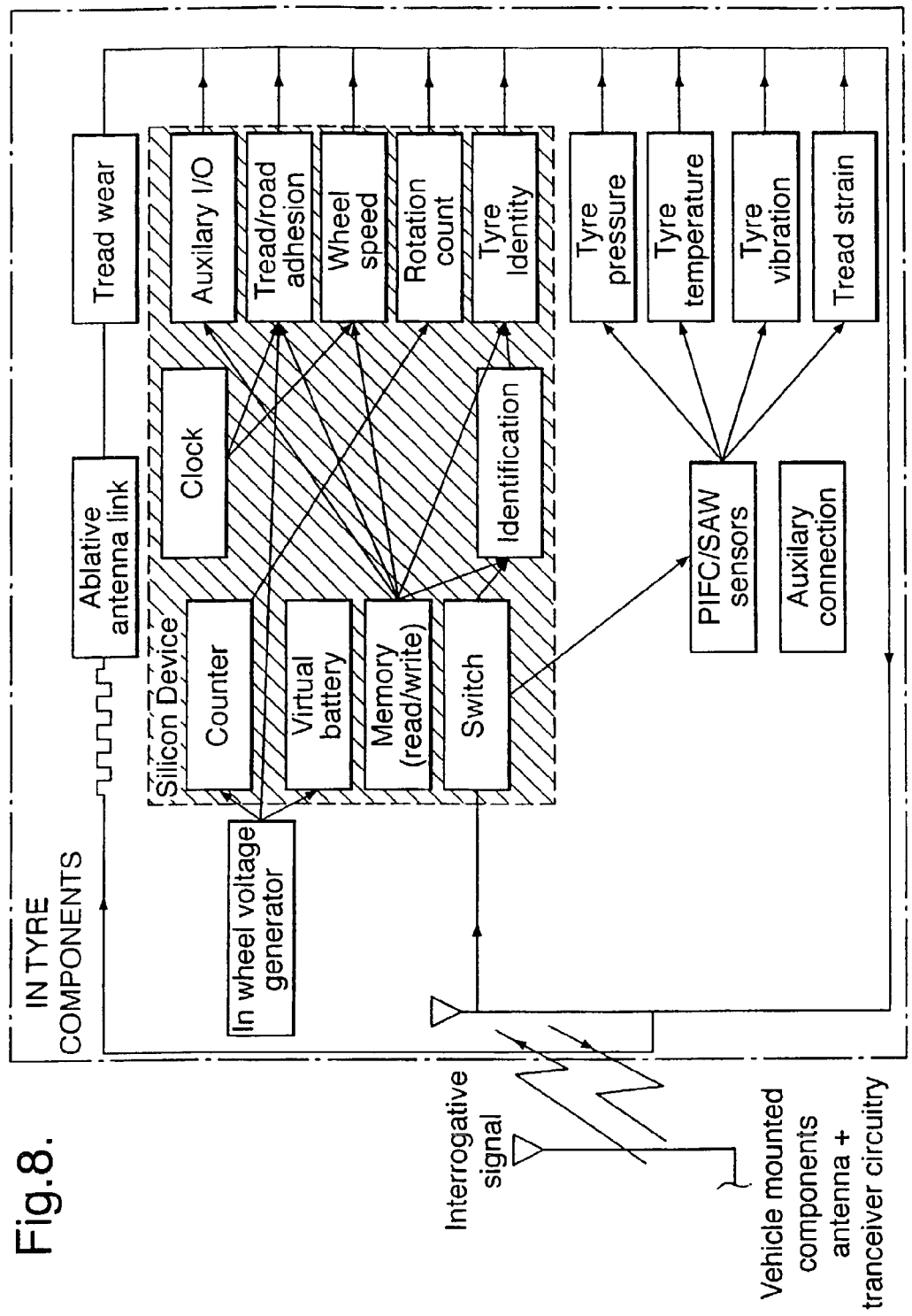
FIG. 8 shows a much expanded sensor array that could be incorporated within a tyre to measure parameters including but not exclusively pressure and temperature, number of rotations and speed, tyre identification, multi axis strain in the tread and wear.

An alternate embodiment that utilizes offset frequencies to separate the various sensing elements is shown in FIG. 8. In this scheme each PIFC device has a fixed impedance element that provides an offset from the original resonant frequency. This effectively provides each PIFC with a unique beat frequency between the reference SAW and the SAW being modulated by the sensing element. In this way an rf interrogating signal will excite all of the devices simultaneously and a number of pairs of frequencies will be returned. Each pair of frequencies will consist f1 the reference SAW resonant frequency and f2 the modulated SAW frequency. The frequency f2=f1+(offset impedance+modulated impedance)*(impedance-to-frequency ratio)

The invention claimed is:

1. A sensor system comprising a passive sensing apparatus comprising: a passive sensor; and an antenna associated with said passive sensor, wherein, in use, the sensor is powered and interrogated by a radio frequency signal (Fs) received via the antenna, the system being characterized by switching means for controlling the connection between the passive sensor and the antenna such that, in a first state of said switching means, said antenna is prevented from transmitting a signal generated by the passive sensor, and, in a second state of said switching means, said antenna is permitted to transmit a signal generated by the passive sensor; and remotely operable control means for controlling the state of the switching means.

2. The system according to claim 1 wherein the switching means is controlled by a coded radio frequency control signal.

3. The system according to claim 2 comprising a mixer for mixing two rf signals and a band pass filter connected to the output of the mixer, the band pass filter being effective to change the switching means to the second state if the output from the mixer corresponds to the pass frequency of the filter.

4. The system according to claim 3 wherein the rf signals are in the 2.45 GHz band.

5. The system according to claim 2 comprising a detector circuit for detecting the modulation frequency of a frequency modulated or amplitude modulated rf signal and a band pass filter connected tote output of the detector, the band pass filter being effective to change the switching means to the second state if the output from the detector corresponds to the pass frequency of the filter.

6. The system according to claim 2 comprising a digital filter for changing the switching means to the second state if a digital code carried by the rf signal corresponds to the digital code of the digital filter.

7. The system according to claim 1 comprising means for generating a voltage in response to receiving a switching signal.

8. The system according to claim 7 wherein the voltage generating means is powered by said switching signal itself.

9. The system according to claim 7 wherein the voltage generating means comprises means for generating electrical energy in response to movement of a tire.

10. The system according to claim 8 wherein the means for generating a voltage comprises a virtual battery.

11. The system according to claim 1 wherein the switching means comprises at least one of a Field-Effect Transistor and an amplifier.

* * * * *